Figure 1:
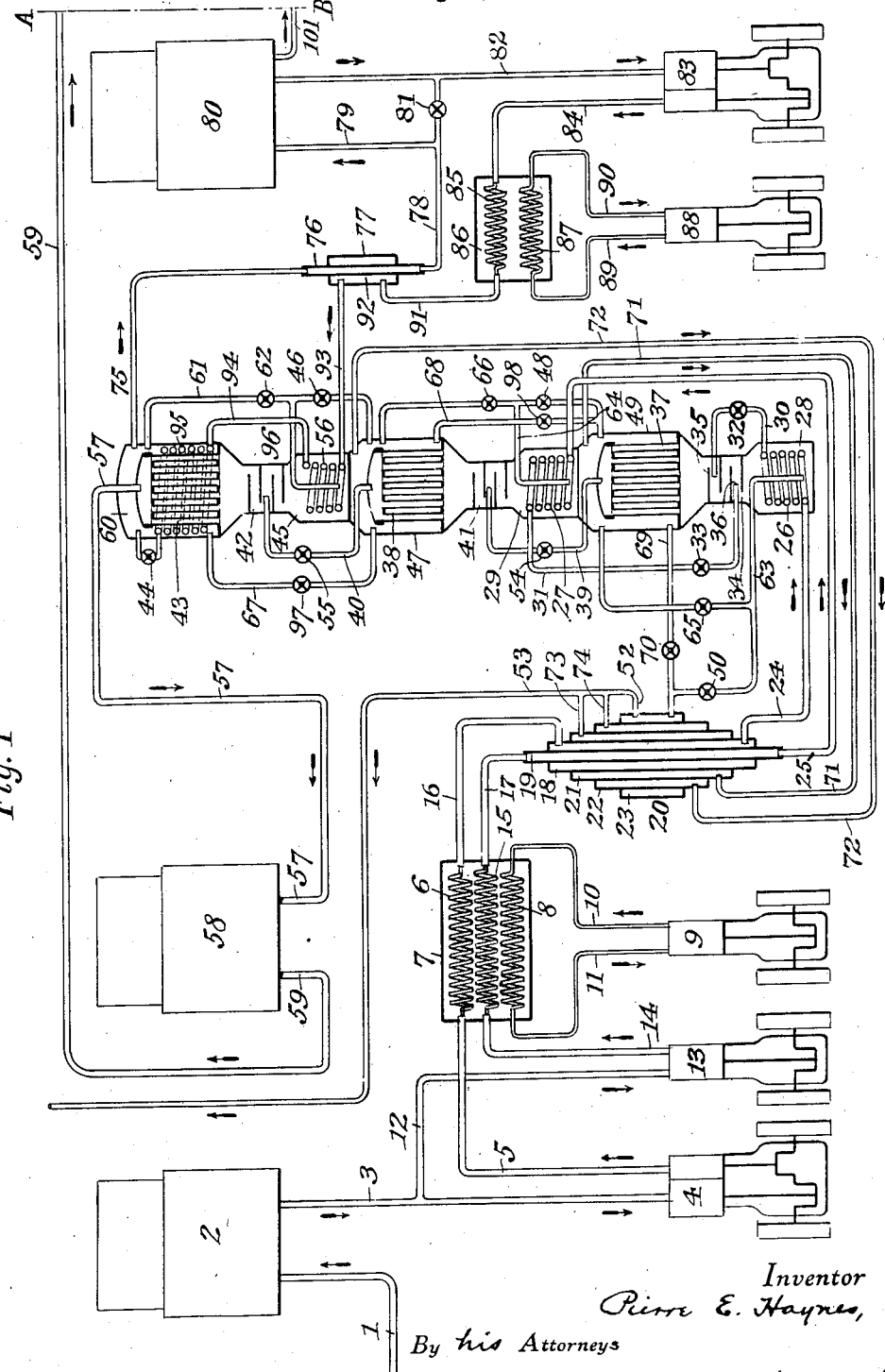

April 3, 1928.

P. E. HAYNES 1,664,412

PRODUCTION OF HELIUM FROM NATURAL GAS

Filed Aug. 7, 1919

2 Sheets-Sheet 1

Inventor
Pierre E. Haynes,
By his Attorneys
Kerr, Page, Cooper & Hayward

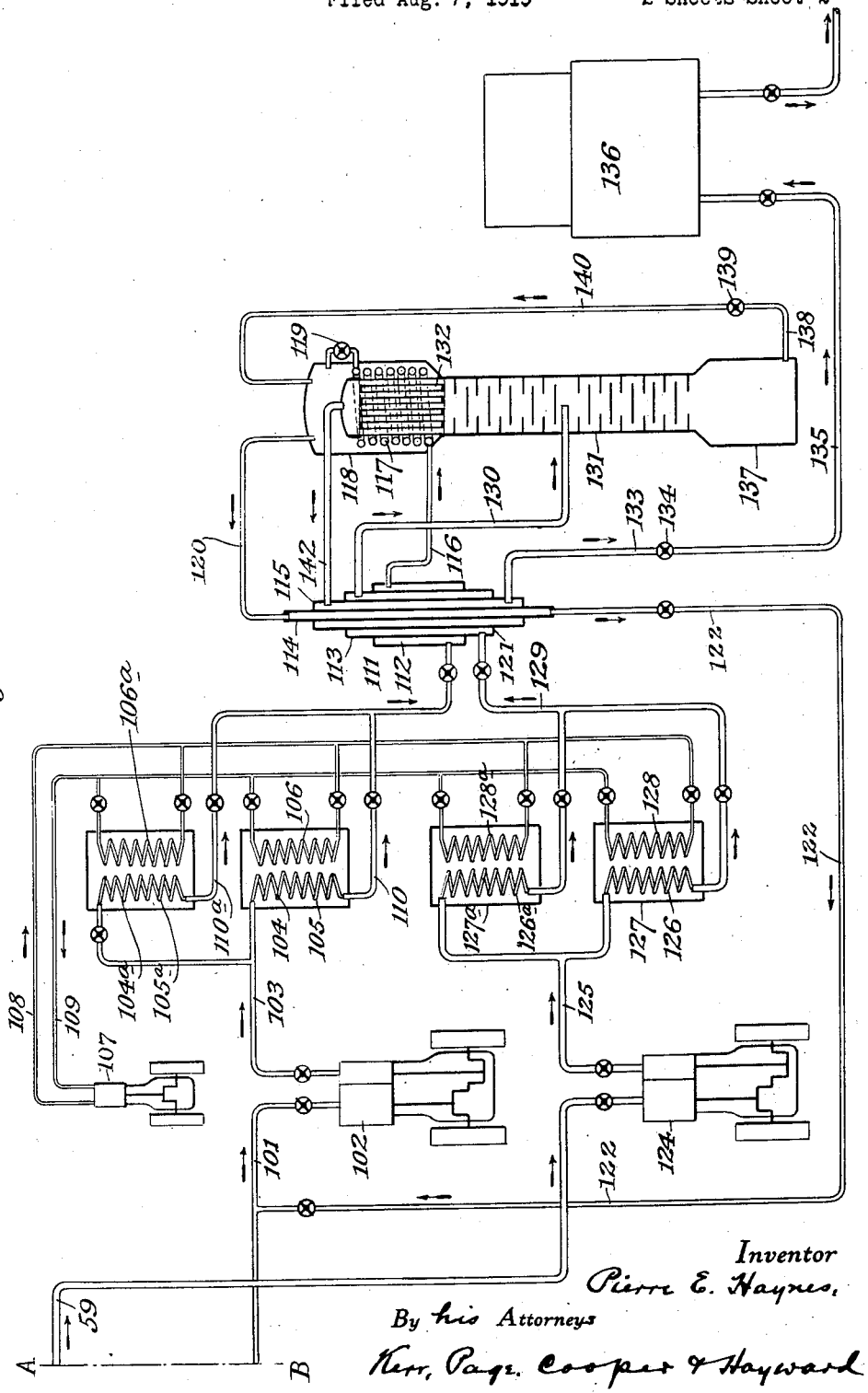

Patented Apr. 3, 1928.

1,664,412

UNITED STATES PATENT OFFICE.

PIERRE E. HAYNES, OF BUFFALO, NEW YORK, ASSIGNOR TO THE LINDE AIR PRODUCTS COMPANY, A CORPORATION OF OHIO.

PRODUCTION OF HELIUM FROM NATURAL GAS.

Application filed August 7, 1919. Serial No. 315,938.

This invention relates to the production of helium, and its chief object is to provide an effective method or process, preferably continuous, by which helium can be obtained in a high degree of purity from a gaseous mixture. More particularly it relates to the production of helium from a gaseous mixture in which the helium content is small, as for example in natural gas. To this and other ends the invention consists in the novel procedure and apparatus hereinafter described.

In applying the invention to a mixture of low helium content, especially a mixture containing nitrogen in considerable amount as in the case of helium-bearing natural gases found in the United States, the process is most efficiently performed in two stages, in the first of which all or substantially all the gases except helium and a portion of the nitrogen are removed, thus giving what may for convenience be termed impure helium. In the second stage the impure helium thus derived is treated to separate out the nitrogen or other gas present, leaving helium of practically any desired degree of purity. By this two-stage process I have been able to obtain, with marked economy in operation, helium about 95 per cent pure from an original mixture containing less than 1 per cent of the gas.

In the preferred method of performing the first stage of the process the gaseous mixture is subjected to liquefying conditions which are successively more energetic or intense, so to speak, for example successively lower temperatures or successively higher pressures or both, whereby the constituents of the mixture, or some of them, are condensed in succession as successive fractions in the order of their liquefying temperatures and pressures, the fraction liquefying at the highest temperature or the lowest pressure being liquefied first. Some or all of the liquids so produced are utilized, with or without expansion to lower pressures and hence to lower temperatures to cool down the original gaseous mixture or the gaseous residue from a preceding condensation or condensations. There is thus established a plurality of refrigerating baths of successively lower boiling points, to which the original gas and the one or more gaseous residues are subjected. For example, in the case of a mixture of four successively liquefiable gases the most easily liquefiable constituent is condensed first, and the resulting liquid is collected and used to cool the compressed original mixture, thereby condensing the first constituent. The liquid produced by condensation of the second or next most easily liquefiable constituent is used to cool the gas remaining after the first condensation, thereby condensing said second constituent; and in like manner the liquid obtained by condensation of the third constituent is employed to cool the remaining gas (chiefly the third and fourth constituents), thereby condensing more or less of the third constituent and leaving the fourth (which is assumed to be uncondensible at the temperatures and pressures employed) in admixture with the remaining gaseous portion of the third. If necessary or desirable, an additional refrigerant, say from an external source, can be employed at a suitable stage in the process. Preferably, also, and especially when the process is used for separating helium from natural gas, the successively liquefied fractions are kept boiling so as to expel or drive off any of the uncondensible constituents (say helium) that may be dissolved, absorbed or otherwise contained in such liquids. This boiling may be conveniently accomplished by passing in heat-exchanging relation to the said liquids the original gaseous mixture and a relatively warm gas or mixture of gases which is to be liquefied and used as a refrigerant at some stage of the process, the heat-exchanges being so regulated, as for example by proper adjustment of the temperature or pressure of the relatively warm gas, as to keep the liquids at boiling temperature or temperatures.

By the steps above outlined it is possible to produce from a gas containing originally as little helium as one per cent or even less, a mixture of two or more gases containing helium to the amount of 50 per cent or more. This mixture is then treated in the second stage of the process, in which the major portion of the other gas or gases (which for convenience may be considered impurities) is eliminated, leaving helium of a relatively high degree of purity. This second stage consists preferably in reducing the partial pressure of the impurity so that it may be liquefied at the temperature at which such impurity boils under atmospheric pressure.

The impurity (nitrogen in the present case) is thereby liquefied out, leaving helium of practically any desired degree of purity, depending on the total pressure employed.

Simple and convenient apparatus for performing the process thus briefly outlined, to separate helium and several other constituents of natural gas (for example ethane, methane and nitrogen) is illustrated diagrammatically in the accompanying drawing, Fig. 1 showing part of the apparatus and Fig. 2 the remaining part. The two figures are to be considered as being joined at the line A—B of each.

If the gaseous mixture contains impurities that have relatively high freezing points, such as water or carbon dioxid, or that may have a deleterious effect on the product or the apparatus, such as acids, alkalis, hydrogen sulfid, hexane, pentane, butane, propane, and similar or other substances, they may be and usually should be removed. The removal may be effected at the outset or at a later stage, as may be most suitable or convenient under particular circumstances.

In the herein-described specific example of my method, the natural gas containing helium (and containing also ethane, methane and nitrogen) is delivered by pipe 1 to the gasometer 2, in which a suitable supply is maintained. From the gasometer the gas is drawn by way of pipe 3 by compressor 4 and a portion is passed under a pressure of 1000 pounds or over, preferably 2500 pounds, per square inch, through pipe 5 to coil 6 of the pre-cooler 7, where it is cooled by any suitable refrigerant which is passed through coil 8 by means of compressor 9 and pipes 10 and 11. If necessary or desirable a duplicate pre-cooler may be provided, for use should the other become choked by freezing or other agency.

Another portion of the natural gas is taken by pipe 12 and compressor 13 and is passed under pressure (not exceeding 100 pounds but preferably at about 75 pounds) through pipe 14 to coil 15 of the precooler 7 where it is cooled by the refrigerant in coil 8.

From cooling coils 6 and 15 the compressed and precooled gas passes through pipes 16 and 17 respectively to pipes 18 and 19 of heat-exchanger 20, where it is cooled by cold gases flowing counter-current in coils 21, 22 and 23, and is delivered by pipes 24 and 25 to coils 26 and 27 in vessels 28 and 29.

From coils 26 and 27 the high-pressure and low-pressure portions of the gaseous mixture are led by pipes 30 and 31 through valves 32 and 33 and are expanded in rectifying column 34 to a pressure less than 100 pounds, and preferably about 75 per square inch. The expansion cools and partially liquefies the gases emerging from orifices 35 and 36, while the cooled but unliquefied portions of the gases rise in column 34 and pass through condenser 37, pipe 39, rectifying column 41, condenser 38, pipe 40 and rectifying column 42 to condenser 43. The latter is bathed in a suitable liquid refrigerant, preferably nitrogen, which liquid is formed by a previously cooled compressed gas expanding at valve 44 from a pressure of, say, 2500 pounds per square inch.

The more easily liquefied portion or portions of the original gaseous mixture reaching the condenser 43 are liquefied therein, and the resulting liquid falls back into rectifying column 42 and vessel 45 is allowed to expand to preferably about atmospheric pressure through valve 46 into vessel 47, where it serves to cool the condenser 38 and thereby causes condensation of the more easily liquefied portion of the gaseous mixture passing upwardly through the condenser 38 as already described. The liquid thus formed falls into column 41 and collects in the vessel 29 and is allowed to expand through valve 48 into vessel 49 where, immersing condenser 37, it serves to cool the portions of the original gaseous mixture delivered to said condenser 37 from coils 26 and 27 as previously described. Of this mixture a portion (consisting in the present instance of ethane, and usually some methane and nitrogen, together with propane if the latter were not previously removed) is condensed in tubes 37 and is added to liquid already formed in vessel 28 around said coil 26.

As soon as coil 26 is sufficiently immersed, the liquid formed in condenser tubes 37 is expanded preferably to about atmospheric pressure through valve 50 (previously closed) and thence passes to heat-exchanger 20 where it passes in pipe 23 in heat-absorbing relation to compressed and relatively warm gases in pipes 18 and 19 and finally emerges into pipe 52 and mingles with other gaseous residues of the process passing out through pipe 53.

Before or after coil 26 is covered with the cold liquid from condenser 37 the gas passing through this coil to the expansion valve 31 is partially liquefied and the liquid portion (consisting chiefly of ethane in the present instance) falls into vessel 28 where it is combined with the liquid previously or subsequently collected in the vessel.

The compressed gas entering coil 26 from pipe 24 is at a higher pressure and temperature than the liquid collected in vessel 28, and a transfer of heat takes place from the gas to the liquid. The former is thereby cooled and liquefaction at valve 32 is accelerated, while the liquid around the coil is warmed and boiled. The more easily evaporated constituents—consisting in the present instance of methane and nitrogen— are expelled, together with helium driven off by the boiling, into column 34. Therein the expelled gases are cooled by colder liquids falling from condenser tubes 37 and some of the gases or vapors are again liquefied (chiefly methane) and returned to vessel 28, while some of the more volatile constituents of the liquid falling from tubes 37 are again returned as vapors to these tubes. A gaseous mixture (consisting of helium, nitrogen and methane) which is incapable of further condensation in condenser 37 finally emerges from the top of the latter. This mixture passes through pipe 39 and regulating valve 54 to rectifying column 41 and thence into condenser tubes 38 where methane and usually some nitrogen are liquefied and fall thence into heat-exchanging relation to warmer vapors arising from liquid in vessel 29 which is being boiled by relatively warm compressed gas in coil 27. The more easily evaporated constituents (nitrogen, dissolved helium and some methane) of the liquid mentioned are thus removed from the vessel, and a mixture of these gases, incapable of further condensation in condenser 38, emerges through pipe 40 and is led through regulating valve 55 to rectifying column 42 and condenser tubes 43. Here the small remaining portion of the original methane and more or less nitrogen are condensed and fall to vessel 45 through vapors of helium and nitrogen arising from the liquid in the vessel which is boiled by relatively warm compressed gas (preferably nitrogen) in coil 56. These vapors rise in tubes 43, where methane and a large part of the remaining nitrogen are liquefied, so that what finally passes off from the tubes in the gaseous form through pipe 57 is helium in admixture with nitrogen. This mixture passes to gasometer 58, whence it may be withdrawn as desired through pipe 59 for treatment in the second stage of the process.

The condensation of gases or vapors in condenser tubes 37 and 38 is effected by the cooling due to contact of the outer surfaces of the tubes with colder liquids in vessels 49 and 47, which liquids are in turn evaporated and passed by means of pipes 71 and 72 to pipes 21 and 22 of heat-exchanger 20 from whence they are drawn by pipes 73 and 74 to pipe 53 and are mingled with other gaseous residues of the process.

The condensation in condenser tubes 43 is effected by cooling due to contact of the outer surfaces of the tubes with boiling nitrogen or other suitable refrigerant in vessel 60, which is evaporated and passes off in the form of vapor through pipe 75. From the latter the vapor passes to pipe 76 of heat-exchanger 77, where it is utilized to cool previously compressed nitrogen flowing countercurrent in pipe 92, and flows thence through pipes 78 and 79 to nitrogen gasometer 80 or from pipe 78 through valve 81 to pipe 82 and compressor 83. Here it is raised to a high pressure, say 2500 pounds per square inch, after which it is passed by pipe 84 to coil 85 of precooler 86 and is precooled by a suitable refrigerant which is passed through coil 87 by compressor 88 through pipes 89 and 90. From the precooler the cooled compressed gas is led through pipe 91 to pipe 92 of heat-exchanger 77 where it is further cooled by the cold expanded nitrogen in pipe 76, mentioned above, and flows thence through pipe 93 to coil 56 where it is still further cooled and reciprocally heats the liquid in which (in vessel 45) the coil is immersed, thereby driving off helium, nitrogen and methane from said liquid. From coil 56 the cold gas passes by pipe 94 to coil 95, where it undergoes additional cooling by the previously expanded and partially liquefied refrigerant (nitrogen) immersing coil 95 in vessel 60, after which it passes to valve 44 where it is expanded and at least partially liquefied. The liquid portion is added to the bath in vessel 60, around condenser tubes 43, and the gaseous portion is added to the evaporated products from said bath.

In general the method of procedure is to pass the condensed constituents from vessels 45 and 29 to vessels 47 and 49 respectively, and from vessel 28 to heat-exchanger 20. The process tends to a concentration of nitrogen in vessel 45, a mixture of nitrogen and methane in vessel 29, and methane and ethane in vessel 28, and eventually, as the operation proceeds under favorable conditions the liquids in these vessels reach a high degree of purity.

Under certain conditions the method described above may be varied. For example, if the natural gas to be treated contains considerable nitrogen, the liquid collecting in vessel 45 will be practically pure nitrogen, in which case it may be desirable to add this liquid nitrogen to the refrigerative bath in vessel 60, which can be done by means of pipes 96 and 61 controlled by valve 62. If the gas to be treated contains a high percentage of methane the liquid in vessel 45 is chiefly methane and may be added to that in vessel 47 (through pipe 96, controlled by valve 46) without seriously affecting the purity of the product condensed in tubes 38 and collected in vessel 29. Similarly, liquids from vessels 28 or 29 may be transferred to the respective condensers immediately above by means of pipes 63 and 64 and controlling valves 65, 66.

If the liquid transferred from one vessel to another is a mixture of substances not having the same boiling point, it sometimes happens that the concentration of one constituent so raises the boiling point, for example in vessel 60 or 47, or both, that the condensers 43 and 38 cease to function efficiently; in which case valves 97 and 98 are opened to allow the liquids to be withdrawn through pipes 67 and 68 to bathe condensers 38 and 37 respectively where their temperatures still permit of efficient operation. If the liquid in vessel 49 becomes too warm it can be withdrawn by pipe 69 through valve 70 to pipe 23 of the heat-exchanger 20 where it is mixed with the liquid residue from vessel 28.

The gas emerging from condenser 43, and collected in gasometer 58, is, ordinarily, more than 50 per cent helium, and under favorable conditions may be 65 per cent or more, the rest being chiefly if not entirely nitrogen. In the second stage of the process the helium content can be increased to upwards of 95 per cent by liquefaction of the nitrogen. For this purpose nitrogen is taken (say from gasometer 80 through pipe 101) by compressor 102 and raised to a high pressure, preferably between 2500 and 3000 pounds per square inch, and is delivered thence through pipe 103 to coil 104 or 104ᵃ of precoolers 105, 105ᵃ (one being used when the other is clogged by freezing) where it is cooled by a suitable refrigerant in coils 106, 106ᵃ, circulated by compressor 107 through pipes 108, 109. The cooled nitrogen emerging from pipe 110 or 110ᵃ now passes through pipe 111 to pipe 112 of the heat-exchanger 113 where it is further cooled by gases flowing counter-current in pipes 114 and 115. From the heat-exchanger it is led by pipe 116 to coil 117 immersed in vessel 118 in a bath of liquid nitrogen at atmospheric pressure, and is expanded to liquefaction through valve 119. The unliquefied portion (if any) escapes from vessel 118 through pipe 120 to section 114 of the heat-exchanger where it serves to cool the gases flowing counter-current in sections 112 and 121. From the heat-exchanger the nitrogen is delivered by pipe 122 to pipe 101 for recirculation.

The crude helium is drawn from gasometer 58 through pipe 59 by compressor 124, where it is raised to a pressure of about 1000 pounds per square inch, and is delivered by pipe 125 to coil 126 or 126ᵃ of precoolers 127, 127ᵃ (used alternately in the same manner as precoolers 105, 105ᵃ) where it is cooled by a suitable refrigerant passed through coils 128, 128ᵃ by compressor 107 and pipes 108, 109, previously described. From the precoolers the gas is delivered by pipe 129 to section 121 of the heat-exchanger 113 where it is further cooled by the gases flowing counter-current in sections 114 and 115 and is then delivered through pipe 130 without expansion to column 131. Any nitrogen or other impurities present have high boiling points compared with helium. A portion of the nitrogen immediately condenses at the low temperature and very high pressure existing at the point where the mixture is introduced into the column. The liquid first produced is approximately at its boiling point at the existing pressure, and the dissolving of helium therein is minimized. This liquid passes toward the bottom of column 131, while the helium with uncondensed nitrogen rises through the upper screens of the column, where they are met by supercooled liquid nitrogen falling back from condenser 132. This super-cooled liquid condenses more of the nitrogen from the mixture until it is itself raised in temperature to its boiling point under the pressure conditions prevailing. There is thus accomplished a further liquefaction of nitrogen at a temperature well above the minimum temperature prevailing in condenser 132, and simultaneously a warming of the uncondensed liquid to a temperature where its solvent power for helium is much reduced. At the temperature of condenser 132, the vapor-pressure of nitrogen is relatively small and the total pressure is so high that the partial pressure of nitrogen is a small component thereof. This insures that the gases passing through the condenser will be of very high helium content.

With the gases passing through the condenser at a pressure of 1000 pounds per square inch, and cooled to the boiling point of nitrogen at atmospheric pressure, the vapor pressure of nitrogen will constitute less than 2% of the total pressure. Even when the partial pressure of nitrogen is 10% or more of the total, helium which is sufficiently pure for most purposes will be produced. The helium in gaseous form passes through the condenser to pipe 142 and is delivered to section 115 of the heat-exchanger 113 where it serves to cool the gases flowing counter-current in sections 112 and 121. From the heat-exchanger the helium passes through pipe 133 to expansion valves 134 where it is expanded to lower pressure and flows thence through pipe 135 to the pure helium gasometer 136.

The liquid nitrogen collects in vessel 137 and is conducted by pipe 138 to valve 139 where it is expanded. From the latter the liquid nitrogen passes through pipe 140 to vessel 118 where it is added to the liquid nitrogen formed at valve 119. In vessel 118 the gaseous products of evaporation are added to the unliquefied nitrogen emerging from pipe 140 and are carried by pipe 120 to section 114 of the heat-exchanger 113.

The process as a whole employs a plurality of condensers in series. The constituents of highest and lowest boiling points are concentrated at the beginning and end of the series. respectively, and between the two an even, progressive decrease of temperature is maintained from the beginning to the end of the series by the use of intermediate mixtures of successively lower boiling points. In each condenser the mixture delivered thereto is cooled by a mixture of similar composition but in liquid form and at a lower pressure, so that as the vapors are condensed their latent heat of condensation passes to the liquid mixture and evaporates the same.

The process described has been found thoroughly effective in actual operation on a commercial scale, producing helium with a nitrogen content of only about 5 per cent. It is also applicable to extraction of neon and hydrogen from gaseous mixtures, as for example from air.

It is to be understood that the invention is not limited to the specific procedure and apparatus described herein but can be carried out in other ways without departure from its spirit. The novel apparatus disclosed herein will form the subject of a later application.

I claim:

1. In a process of obtaining helium from natural gas, compressing and cooling the gas, expanding the cooled compressed gas and thereby liquefying a substantial portion thereof, consisting principally of hydrocarbons; rectifying said liquefied portion to recover helium therefrom, and adding this helium to the residual expanded gas; subjecting the residual expanded gas to successively lower temperatures to condense its constituents other than helium in the order of their liquefying temperatures at the pressure to which they were expanded, collecting the liquids separately, and utilizing said liquids separately in cooling the gas to the said successively lower temperatures; whereby helium in gaseous form is concentrated as a final residue; and conducting off and collecting such final residue.

2. In a process of obtaining helium from natural gas containing ethane, methane, nitrogen and helium, compressing the gas; subjecting part of the compressed gas to a refrigerating bath containing liquid ethane and methane, expanding such part to condense ethane and methane, and adding the condensate to said refrigerating bath; simultaneously subjecting another part of the compressed gas to a refrigerating bath containing liquid methane and nitrogen, expanding such part to liquefy ethane and methane, and adding the condensate to the first-mentioned refrigerating bath; passing the gaseous residue of the above liquefactions in rectifying relation to a condensate from a condenser cooled by liquid methane and nitrogen, and thence into said condenser to condense ethane and methane and maintain the supply of condensate for said rectification, whereby the gaseous residue from said condenser is substantially free from ethane; and passing said gaseous residue in rectifying relation to a condensate from a condenser cooled by the aforesaid nitrogen and methane bath and thence in said condenser, whereby methane and nitrogen are condensed and after passing in rectifying relation to said residue are added to said nitrogen and methane bath, leaving a gaseous residue substantially free from methane.

3. In a process of obtaining helium from natural gas containing ethane, methane, nitrogen and helium, compressing part of the gas to a high pressure and part to a low pressure; subjecting the high-pressure part of the compressed gas to a refrigerating bath containing liquid ethane and methane, expanding such part to condense ethane and methane, and adding the condensate to said refrigerating bath; simultaneously subjecting the low-pressure part of the compressed gas to a refrigerating bath containing liquid methane and nitrogen to liquefy ethane and methane, and adding the condensate to the first-mentioned refrigerating bath; passing the gaseous residue of the above liquefactions in rectifying relation to a condensate from a condenser cooled by the liquid methane and nitrogen, and thence into said condenser to condense ethane and methane and maintain the supply of condensate for said rectification and for said ethane and methane bath, whereby the gaseous residue from said condenser is substantially free from ethane; and passing said gaseous residue in rectifying relation to a condensate from a condenser cooled by the aforesaid methane and nitrogen bath and thence in said condenser, whereby methane is condensed and after passing in rectifying relation to said residue is added to said methane and nitrogen bath, leaving a gaseous residue substantially free from methane.

4. In a process of obtaining helium from natural gas containing ethane, methane, nitrogen and helium, compressing the gas; subjecting part of the compressed gas to a refrigerating bath containing liquid ethane and methane, expanding such part to condense ethane and methane, and adding the condensate to said refrigerating bath; simultaneously subjecting another part of the compressed gas to a refrigerating bath containing liquid methane and nitrogen to condense ethane and methane, and adding the condensate to the first-mentioned refrigerating bath; passing the gaseous residue of the above liquefactions in rectifying relation to a condensate from a condenser cooled by liquid nitrogen and methane, and thence into said condenser to condense ethane and methane and maintain the supply of condensate for said rectification, whereby the gaseous residue from said condenser is substantially free from ethane, passing said gaseous residue in rectifying relation to a condensate from a condenser cooled by a methane and nitrogen bath and thence into said condenser, whereby methane and nitrogen are condensed and after passing in rectifying relation to said residue are added to said methane and nitrogen bath, leaving a gaseous residue substantially free from methane; passing the last-mentioned residue into a condenser cooled by a bath of liquid nitrogen to condense nitrogen; collecting the condensed nitrogen; and collecting the gaseous helium-containing residue from the last-mentioned condensation.

5. Process of isolating helium from a mixture in which helium and nitrogen predominate, which comprises, maintaining a bath of liquid nitrogen at a relatively low pressure, passing gaseous nitrogen at a relatively high pressure into heat-exchanging relation to said bath, expanding said high-pressure nitrogen to the pressure of said bath and adding the expanded nitrogen to the bath, passing said helium-nitrogen mixture into heat-exchanging relation to said bath, said mixture being at a pressure sufficient to ensure the liquefaction of the bulk of the nitrogen during this step, recovering the unliquefied helium, and expanding the liquefied nitrogen and adding it to the nitrogen bath.

6. Process of producing a helium concentrate from natural gas which comprises, continuously compressing said gas to a relatively high pressure, cooling and expanding the gas and introducing the expanded gas into a rectification column, continuously compressing natural gas to a relatively low pressure, cooling the low-pressure gas to a temperature below that to which the high-pressure gas is cooled, introducing said low-pressure gas into said rectification column at a point below the point of introduction of the high-pressure gas, passing the gases from the top of the rectification column to a condenser to liquefy a portion thereof, and returning the liquid so formed to the rectification column in contact with the gases rising therein.

In testimony whereof I hereunto affix my signature.

PIERRE E. HAYNES.